(12) United States Patent
Wang et al.

(10) Patent No.: US 9,894,582 B2
(45) Date of Patent: Feb. 13, 2018

(54) CONGESTION CONTROL IMPLEMENTATION METHOD AND APPARATUS

(71) Applicant: Huawei Technologies Co., Ltd., Shenzhen, Guangdong (CN)

(72) Inventors: Xinyong Wang, Shenzhen (CN); Haopeng Zhu, Shenzhen (CN); Tao Jiang, Shenzhen (CN); Xiaobo Wu, Shanghai (CN); Xiaoji Sun, Shanghai (CN); Wei Tan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/843,779

(22) Filed: Sep. 2, 2015

(65) Prior Publication Data

US 2015/0382267 A1 Dec. 31, 2015
US 2016/0242087 A9 Aug. 18, 2016

Related U.S. Application Data

(63) Continuation of application No. PCT/CN2013/084754, filed on Sep. 30, 2013.

(30) Foreign Application Priority Data

Mar. 6, 2013 (CN) .......................... 2013 1 0071325

(51) Int. Cl.
*H04W 4/00* (2009.01)
*H04W 36/22* (2009.01)
(Continued)

(52) U.S. Cl.
CPC ....... *H04W 36/22* (2013.01); *H04W 28/0252* (2013.01); *H04W 28/0268* (2013.01);
(Continued)

(58) Field of Classification Search
CPC ......... H04W 36/0022; H04W 36/0011; H04W 36/14; H04W 28/0252; H04W 28/0268;
(Continued)

(56) References Cited

U.S. PATENT DOCUMENTS

2010/0195644 A1  8/2010  Hao
2011/0171924 A1  7/2011  Faccin et al.
(Continued)

FOREIGN PATENT DOCUMENTS

CN    101330748 A    12/2008
CN    101902715 A    12/2010
(Continued)

OTHER PUBLICATIONS

ETSI TS 123 216 v11.7.0 , Digital Cellular telecommunications system (Phase 2+); Universal Mobile Communications System (UMTS); LTE- Signle Radio Voice Call Continuity (SRVCC) Stage 2 (3GPP TS 23.216 version 11.7.0 Release 11), Jan. 2013.*
(Continued)

*Primary Examiner* — Fred Casca

(57) ABSTRACT

The embodiments of the present invention provide a congestion control implementation method and apparatus, where the method includes: determining one or more user equipments for which single radio voice call continuity (SRVCC) offloading needs to be performed; sending an SRVCC offload message to an E-UTRAN NodeB serving the one or more user equipments, so that when triggering an SRVCC handover procedure, the E-UTRAN NodeB switches the one or more user equipments from a Long Term Evolution (LTE) domain to a circuit switched (CS) domain. When the SRVCC handover procedure is completed, the one or more user equipments can be switched from VoLTE user equipments to VoCS user equipments. In this way, LTE cell (Continued)

load can be alleviated and QoS of the one or more user equipments can be guaranteed.

13 Claims, 10 Drawing Sheets

(51) Int. Cl.
*H04W 28/08* (2009.01)
*H04W 36/00* (2009.01)
*H04W 28/02* (2009.01)

(52) U.S. Cl.
CPC ....... *H04W 28/0289* (2013.01); *H04W 28/08* (2013.01); *H04W 36/0022* (2013.01)

(58) Field of Classification Search
CPC . H04W 28/0289; H04W 28/08; H04W 36/22; H04W 36/24; H04W 76/02; H04L 65/1069; H04L 65/1016; H04L 65/1046
USPC ............... 370/331, 352, 466; 455/436, 435.1
See application file for complete search history.

(56) References Cited

U.S. PATENT DOCUMENTS

| | | | |
|---|---|---|---|
| 2011/0176414 A1 | 7/2011 | De Franca Lima et al. | |
| 2012/0218889 A1* | 8/2012 | Watfa | H04W 60/04 370/230 |
| 2012/0302240 A1 | 11/2012 | Tamaki et al. | |
| 2013/0028196 A1 | 1/2013 | Zou et al. | |
| 2013/0265988 A1* | 10/2013 | Nishida | H04W 36/14 370/331 |
| 2013/0329559 A1* | 12/2013 | Cabrera | H04W 28/0289 370/235 |
| 2014/0022904 A1* | 1/2014 | Ahmad | H04W 28/0289 370/235 |

FOREIGN PATENT DOCUMENTS

| | | |
|---|---|---|
| CN | 102378148 A | 3/2012 |
| CN | 102934487 A | 2/2013 |
| EP | 2 200 370 A1 | 6/2010 |
| JP | 2010-141669 A | 6/2010 |
| JP | 2011-172231 A | 9/2011 |
| JP | 2012-227815 A | 11/2012 |
| WO | WO 2012/000535 A1 | 1/2012 |
| WO | WO 2013/024054 A1 | 2/2013 |
| WO | WO 2015/058393 A1 | 4/2015 |

OTHER PUBLICATIONS

"3rd Generation Partnership Project; Technical Specification Group Services and System Aspects; Single Radio Voice Call Continuity (SRVCC); Stage 2 (Release 11)", 3GPP TS 23.216 V11.8.0, Mar. 2013, 67 pages.
"Load balance & exception handling with LTE-1xRTT SRVCC architecture", 3GPP TSG SA WG2 Meeting #64, Apr. 7-11, 2008, 7 pages, TD S2-082230.
"Discussion on the SGSN overload control", 3GPP TSG GERAN #56, Nov. 19-23, 2012, 5 pages.
"3rd Generation Partnership Project; Technical Specification Group Services and System Aspects; Single Radio Voice all Continuity (SRVCC); Stage 2 (Release 11)", 3GPP TS 23.216 V11.7.0, Dec. 2012, 7 pages.

* cited by examiner

CONGESTION CONTROL IMPLEMENTATION METHOD AND APPARATUS

CROSS-REFERENCE TO RELATED APPLICATION

This application is a continuation of International Application No. PCT/CN2013/084754, filed on Sep. 30, 2013, which claims priority to Chinese Patent Application No. 201310071325.4, filed on Mar. 6, 2013, both of which are hereby incorporated by reference in their entireties.

TECHNICAL FIELD

The embodiments of the present invention relate to the field of wireless communications technologies, and more specifically, to a congestion control implementation method and apparatus.

BACKGROUND

With development of technologies, high bandwidth promised by a Long Term Evolution (Long Term Evolution, "LTE" for short) network brings a great opportunity for mobile bandwidth growth. Compared with an LTE data service, voice over LTE (Voice Over LTE, "VoLTE" for short) raises a higher requirement on wireless coverage resources, mainly because VoLTE requires higher quality-of-service (Quality-of-Service, QoS), and has a lower delay tolerance. In addition, VoLTE supports high-definition audio and video encoding and decoding, which means that VoITE has a higher bandwidth requirement, bandwidth usage of VoLTE needs to be preferably guaranteed by LTE resources scheduling. For the foregoing reasons, a growth in VoLTE subscriber base means coverage shrinkage of an LTE cell, thereby increasing cell congestion and resulting in phenomena such as call drops or blocked calls.

SUMMARY

The embodiments of the present invention provide a congestion control implementation method and apparatus, so as to reduce LTE cell load when the number of VoLTE users increases.

According to a first aspect, an embodiment of the present invention provides a congestion control implementation method, where the method is executed by a mobility management entity MME, and includes: determining one or more user equipments for which single radio voice call continuity SRVCC offloading needs to be performed; sending an SRVCC offload message to an E-UTRAN NodeB eNodeB serving the one or more user equipments, so that when triggering an SRVCC handover procedure, the E-UTRAN NodeB switches the one or more user equipments from a Long Term Evolution LTE domain to a circuit switched CS domain.

With reference to the first aspect, in a first possible implementation, before the determining one or more user equipments, the method further includes: determining that the MME is in congestion state.

With reference to the first possible implementation, in a second possible implementation, the determining that the MME is in congestion state includes: determining that the MME is in congestion state according to cell congestion information sent by a network side device, where the cell congestion information includes a cell congestion level and cell information; or collecting statistics about a quality-of-service class identifier QCI bearer setup success rate, and when the QCI bearer setup success rate is less than a preset threshold, determining that the MME is in congestion state.

With reference to the first aspect or either of the foregoing possible implementations, in a third possible implementation, after the sending an SRVCC offload message to an E-UTRAN NodeB eNodeB serving the one or more user equipments, the method further includes: sending an offload indication to a mobile switching center MSC, where the offload indication is used to notify the MSC that the one or more user equipments are user equipments for which SRVCC offloading is already performed, so that the MSC manages and controls the one or more SRVCC-offloaded user equipments.

With reference to the first aspect or any one of the foregoing possible implementations, in a fourth possible implementation, after the E-UTRAN NodeB switches the one or more user equipments from an LTE domain to a CS domain, the method further includes:
switching the one or more user equipments from the CS domain back to the LTE domain when CS-to-LTE switching is required.

According to a second aspect, an embodiment of the present invention provides a congestion control implementation method, where the method is executed by an E-UTRAN NodeB eNodeB, and the method includes: receiving a single radio voice call continuity SRVCC offload message sent by a mobility management entity MME, where the SRVCC offload message is used to instruct to trigger an SRVCC handover procedure for one or more user equipments served by the E-UTRAN NodeB; and switching the one or more user equipments from a Long Term Evolution LTE domain to a circuit switched CS domain when the SRVCC handover procedure is triggered for the one or more user equipments.

With reference to the second aspect, in a first possible implementation, before the SRVCC handover procedure is triggered for the one or more user equipments, the method further includes: performing connected mode measurement for the one or more user equipments.

According to a third aspect, an embodiment of the present invention provides a mobility management entity MME, including: a control unit, configured to determine one or more user equipments for which single radio voice call continuity SRVCC offloading needs to be performed; and a sending unit, configured to send an SRVCC offload message to an E-UTRAN NodeB eNodeB serving the one or more user equipments determined by the control unit, so that the E-UTRAN NodeB switches the one or more user equipments from a Long Term Evolution LTE domain to a circuit switched CS domain during an SRVCC handover procedure.

With reference to the third aspect, in a first possible implementation, the control unit is further configured to determine, before the one or more user equipments are determined, that the MME is in congestion state.

With reference to the first possible implementation, in a second possible implementation, the MME further includes a receiving unit, configured to receive cell congestion information sent by a network side device, where the cell congestion information includes a cell congestion level and cell information; and the control unit is specifically configured to determine, according to the cell congestion information received by the receiving unit, that the MME is in congestion state.

With reference to the first possible implementation, in a third possible implementation, the control unit is further configured to collect statistics about a quality-of-service class identifier QCI bearer setup success rate; and the control unit is specifically configured to: when the QCI bearer setup success rate is less than a preset threshold, determine that the MME is in congestion state.

With reference to the third aspect or any one of the foregoing possible implementations, in a fourth possible implementation, the sending unit is further configured to send an offload indication to a mobile switching center MSC, where the offload indication is used to notify the MSC that the one or more user equipments are user equipments for which SRVCC offloading is already performed.

With reference to the third aspect or any one of the foregoing possible implementations, in a fifth possible implementation, the control unit is further configured to switch the one or more user equipments from the CS domain to the LTE domain when CS-to-LTE switching is required.

According to a fourth aspect, an embodiment of the present invention provides an E-UTRAN NodeB eNodeB, including: a receiving unit, configured to receive a single radio voice call continuity SRVCC offload message sent by a mobility management entity MME, where the SRVCC offload message is used to instruct to trigger an SRVCC handover procedure for one or more user equipments served by the E-UTRAN NodeB; and a control unit, configured to switch, according to the SRVCC offload message received by the receiving unit, the one or more user equipments from a Long Term Evolution LTE domain to a circuit switched CS domain when the SRVCC handover procedure is triggered for the one or more user equipments.

With reference to the fourth aspect, in a first possible implementation, the control unit is further configured to perform connected mode measurement for the one or more user equipments; and the control unit is specifically configured to switch, according to a result of the connected mode measurement, the one or more user equipments from the Long Term Evolution LTE domain to the circuit switched CS domain when the SRVCC handover procedure is triggered for the one or more user equipments.

According to the embodiments provided in the present invention, an MME can instruct, by using an SRVCC offload message, an E-UTRAN NodeB to which one or more user equipments belong to trigger an SRVCC handover procedure. When the SRVCC handover procedure is completed, the one or more user equipments can be switched from VoLTE user equipments to VoCS user equipments. In this way, LTE cell load can be alleviated and QoS of the one or more user equipments can be guaranteed.

According to a fifth aspect, an embodiment of the present invention provides a congestion control implementation method, where the method is executed by a mobile switching center MSC, and the method includes: receiving an offload indication sent by a mobility management entity MME, where the offload indication is used to notify the MSC that one or more user equipments are user equipments for which single radio voice call continuity SRVCC offloading is already performed; and managing and controlling the one or more user equipments according to the offload indication, where the managing and controlling the one or more user equipments according to the offload indication includes: when a voice call of the one or more user equipments ends, sending return-to-LTE-domain information to a base station controller or a radio network controller by using a clearing message, so that the base station controller or the radio network controller fast returns the one or more user equipments to a Long Term Evolution LTE domain.

With reference to the fifth aspect, in a first possible implementation, before the sending return-to-LTE-domain information to a base station controller or a radio network controller by using a clearing message, the method further includes: adding a tariff indication to a charging data record for voice call fallback of the one or more user equipments, where the tariff indication is used to indicate that the one or more user equipments use a same tariff policy as a voice over Long Term Evolution VoLTE user equipment.

With reference to the fifth aspect or the first possible implementation, in a second possible implementation, before the sending return-to-LTE-domain information to a base station controller or a radio network controller by using a clearing message, the method further includes: when the one or more user equipments make a voice call, determining that high-speed encoding and decoding is used during the voice call.

According to a sixth aspect, the present invention provides a mobile switching center MSC, including: a receiving unit, configured to receive an offload indication sent by a mobility management entity MME, where the offload indication is used to notify the MSC that one or more user equipments are user equipments for which single radio voice call continuity SRVCC offloading is already performed; a control unit, configured to determine return-to-LTE-domain information according to the offload indication received by the receiving unit; and a sending unit, configured to, when a voice call of the one or more user equipments ends, send the return-to-LTE-domain information determined by the control unit, to a base station controller or a radio network controller by using a clearing message.

With reference to the sixth aspect, in a first possible implementation, the control unit is further configured to add, according to the offload indication received by the receiving unit, a tariff indication to a charging data record for voice call fallback of the one or more user equipments before the sending unit sends the return-to-LTE-domain information.

With reference to the sixth aspect or the first possible implementation, in a second possible implementation, the control unit is further configured to: before the sending unit sends the return-to-LTE-domain information, determine, according to the offload indication received by the receiving unit, that high-speed encoding and decoding is used during the voice call of the one or more user equipments.

According to a seventh aspect, an embodiment of the present invention provides a congestion control implementation method, where the method is executed by a mobility management entity MME, and includes: determining one or more user equipments for which single radio voice call continuity SRVCC offloading is already performed; and switching the one or more user equipments from a circuit switched CS domain to a Long Term Evolution LTE domain.

With reference to the seventh aspect, in a first possible implementation, before the determining one or more user equipments, the method further includes: determining that the MME is in normal state.

With reference to the first possible implementation, in a second possible implementation, the determining that the MME is in normal state includes: determining, according to cell congestion information sent by a network side device, that the MME is in normal state, where the cell congestion information includes a cell congestion level and cell information; or collecting statistics about a quality-of-service class identifier QCI bearer setup success rate, and when the QCI bearer setup success rate is greater than a preset threshold, determining that the MME is in normal state.

According to an eighth aspect, an embodiment of the present invention provides a mobility management entity MME, including: a first control unit, configured to determine one or more user equipments for which single radio voice call continuity SRVCC offloading is already performed; and a second control unit, configured to switch the one or more user equipments determined by the first control unit from a circuit switched CS domain to a Long Term Evolution LTE domain.

With reference to the eighth aspect, in a first possible implementation, the MME further includes: a third control unit, configured to determine that the MME is in normal state.

With reference to the first possible implementation, in a second possible implementation, the MME further includes a receiving unit, where the receiving unit is configured to receive cell congestion information sent by a network side device, where the cell congestion information includes a cell congestion level and cell information; and the third control unit is specifically configured to determine, according to the cell congestion information received by the receiving unit, that the MME is in normal state.

With reference to the first possible implementation, in a third possible implementation, the third control unit is further configured to collect statistics about a quality-of-service class identifier QCI bearer setup success rate; and the third control unit is specifically configured to: when the QCI bearer setup success rate is greater than a preset threshold, determine that the MME is in normal state.

According to the embodiments provided in the present invention, an MME can instruct, by using an SRVCC offload message, an E-UTRAN NodeB to which one or more user equipments belong to trigger an SRVCC handover procedure. When the SRVCC handover procedure is completed, the one or more user equipments can be switched from VoLTE user equipments to VoCS user equipments. In this way, LTE cell load can be alleviated and QoS of the one or more user equipments can be guaranteed.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: Global System for Mobile Communications (Global System for Mobile Communications, "GSM" for short), a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, an LTE frequency division duplex (Frequency Division Duplex, "FDD" for short) system, LTE time division duplex (Time Division Duplex, "TDD" for short), Universal Mobile Telecommunications System (Universal Mobile Telecommunication System, "UMTS" for short), or the like.

A user equipment (User Equipment, UE) may also be referred to as a mobile terminal (Mobile Terminal, MT), a mobile user equipment, and the like, and may communicate with one or more core networks through a radio access network (for example, Radio Access Network, RAN). The user equipment may be a mobile terminal, such as a mobile phone (also referred to as a "cellular" phone) or a computer with a mobile terminal. For example, the user equipment may be a portable, pocket-sized, handheld, computer built-in, or vehicle-mounted mobile apparatus.

Figure 1:
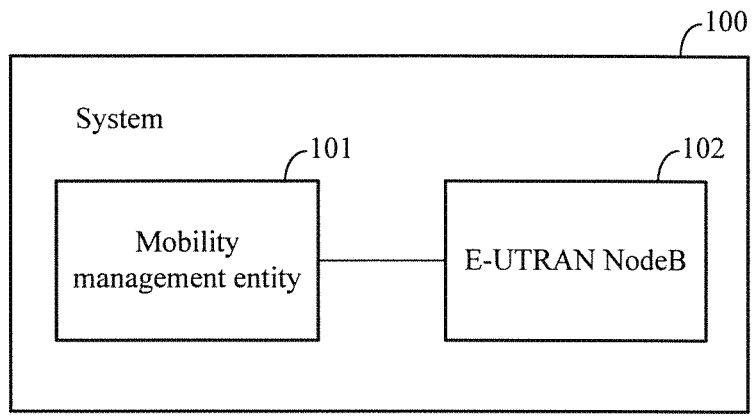
FIG. 1 is a schematic diagram depicting an architecture of a congestion control implementation system according to an embodiment of the present invention.

FIG. 1 is a schematic diagram depicting an architecture of a congestion control implementation system according to an embodiment of the present invention. The congestion control implementation system 100 includes a mobility management entity (Mobility Management Entity, MME) 101 and an E-UTRAN NodeB (E-UTRAN NodeB, eNodeB) 102.

The MME 101 may initiate a single radio voice call continuity (Single Radio Voice Call Continuity, SRVCC) offloading procedure, including: determining one or more user equipments for which SRVCC offloading needs to be performed, and sending an SRVCC offload message to the E-UTRAN NodeB 102 to which the one or more user equipments belong, where the SRVCC offload message is used to instruct the E-UTRAN NodeB 102 to trigger an SRVCC handover procedure for the one or more user equipments.

The E-UTRAN NodeB 102 to which the one or more user equipments belong receives the SRVCC offload message. When triggering a standard SRVCC handover procedure for the one or more user equipments, the E-UTRAN NodeB 102 switches the one or more user equipments from an LTE domain to a circuit switched (Circuit Switched, CS) domain. Specifically, when the E-UTRAN NodeB 102 receives the SRVCC offload message, the E-UTRAN NodeB 102 triggers the SRVCC handover procedure for the one or more user equipments. When the SRVCC handover procedure is successfully performed for the one or more user equipments, the one or more user equipments may be switched from VoLTE user equipments to voice over CS (Voice Over CS, VoCS) user equipments, and resort to the CS domain for communication.

According to the system shown in FIG. 1, an MME can instruct, by using an SRVCC offload message, an E-UTRAN NodeB to which one or more user equipments belong to trigger an SRVCC handover procedure. When the SRVCC handover procedure is completed, the one or more user equipments can be switched from VoLTE user equipments to VoCS user equipments. In this way, LTE cell load can be alleviated and QoS of the one or more user equipments can be guaranteed.

Figure 2:
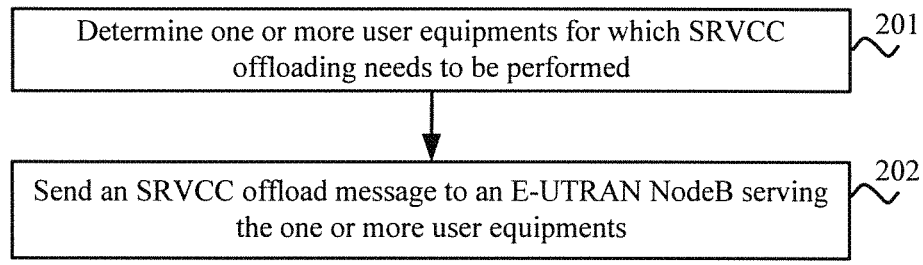
FIG. 2 is a schematic flowchart of a congestion control implementation method according to an embodiment of the present invention.

FIG. 2 is a schematic flowchart of a congestion control implementation method according to an embodiment of the present invention. The method shown in FIG. 2 is executed by an MME.

201: Determine one or more user equipments for which SRVCC offloading needs to be performed.

Optionally, the MME may further determine, before the one or more user equipments are determined, whether the MME is in congestion state. When it is ascertained that the MME is in congestion state, the MME determines the one or more user equipments for which SRVCC offloading needs to be performed, so that the one or more user equipments will be offloaded from an LTE domain to a CS domain.

Optionally, the MME may determine, according to cell congestion information sent by a network side device, that the MME is in congestion state, where the network side device may be a congestion control center, or may be an E-UTRAN NodeB (eNodeB). The MME may further collect statistics about a QoS class identifier (QoS Class Identifier, QCI) bearer setup success rate, and determine that the MME is in congestion state according to the QCI bearer setup success rate.

It can be understood that, the MME may use another means to determine commencement of the step 201. For example, the MME may determine, according to a received request from a user equipment or another network side device (such as a base station), the one or more user equipments for which SRVCC offloading needs to be performed, so that the one or more user equipments will be offloaded to the CS domain.

202: Send an SRVCC offload message to an E-UTRAN NodeB (eNodeB) serving the one or more user equipments, so that when triggering an SRVCC handover procedure, the E-UTRAN NodeB switches the one or more user equipments from an LTE domain to a CS domain.

Specifically, when the E-UTRAN NodeB receives the SRVCC offload message, the E-UTRAN NodeB triggers the SRVCC handover procedure for the one or more user equipments. When the SRVCC handover procedure is successfully performed, the one or more user equipments may be switched from VoLTE user equipments to VoCS user equipments, and resort to the CS domain for communication.

According to the method shown in FIG. 2, an MME can instruct, by using an SRVCC offload message, an E-UTRAN NodeB to which one or more user equipments belong to trigger an SRVCC handover procedure. When the SRVCC handover procedure is completed, the one or more user equipments can be switched from VoLTE user equipments to VoCS user equipments. In this way, LTE cell load can be alleviated and QoS of the one or more user equipments can be guaranteed.

Figure 3:
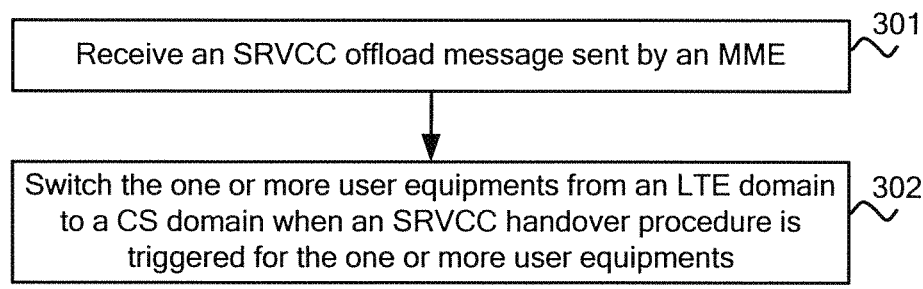
FIG. 3 is a schematic flowchart of a congestion control implementation method according to an embodiment of the present invention.

FIG. 3 is a schematic flowchart of a congestion control implementation method according to an embodiment of the present invention. The method shown in FIG. 3 is executed by an E-UTRAN NodeB.

301: Receive an SRVCC offload message sent by an MME, where the SRVCC offload message is used to instruct to trigger an SRVCC handover procedure for one or more user equipments served by the E-UTRAN NodeB.

302: Switch the one or more user equipments from an LTE domain to a CS domain when the SRVCC handover procedure is triggered for the one or more user equipments.

Specifically, when the E-UTRAN NodeB receives the SRVCC offload message, the E-UTRAN NodeB triggers the SRVCC handover procedure for the one or more user equipments. When the SRVCC handover procedure is successfully performed, the one or more user equipments may be switched from VoLTE user equipments to VoCS user equipments, and resort to the CS domain for communication.

According to the method shown in FIG. 3, when an E-UTRAN NodeB receives an SRVCC offload message sent by an MME, the E-UTRAN NodeB may trigger an SRVCC handover procedure for one or more UEs. When the SRVCC handover procedure is successfully performed, the one or more user equipments can be switched from VoLTE user equipments to VoCS user equipments. In this way, LTE cell load can be alleviated and QoS of the one or more user equipments can be guaranteed.

Figure 4:
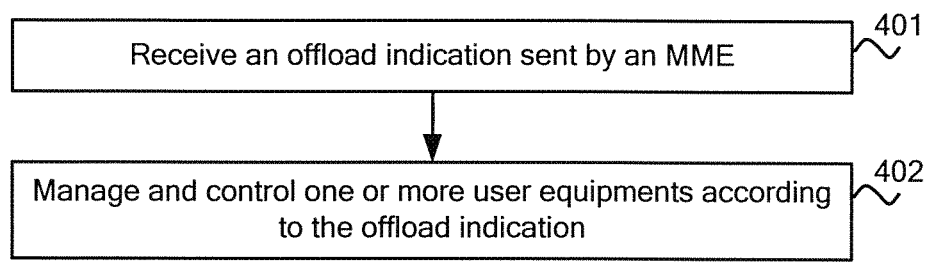
FIG. 4 is a schematic flowchart of a congestion control implementation method according to an embodiment of the present invention.

FIG. 4 is a schematic flowchart of a congestion control implementation method according to an embodiment of the present invention. The method shown in FIG. 4 is executed by a mobile switching center (Mobile Switching Center, MSC).

401: Receive an offload indication sent by an MME, where the offload indication is used to notify that one or more user equipments are user equipments for which SRVCC offloading is already performed.

402: Manage and control the one or more user equipments according to the offload indication.

The step of managing and controlling the one or more user equipments according to the offload indication includes: when a voice call of the one or more user equipments ends, sending return-to-LTE-domain information to a base station controller (Base Station Controller, BSC) or a radio network controller (Radio Network Controller, RNC) by using a clearing message, so that the BSC or the RNC fast returns the one or more user equipments to a Long Term Evolution LTE domain.

Optionally, the return-to-LTE-domain information may include fourth generation (4 Generation, 4G) public land mobile network (Public Land Mobile Network, PLMN) information and a fast-return indication.

According to the method shown in FIG. 4, an MSC may learn a user equipment for which SRVCC offloading is already performed, add return information in a clearing message sent when a voice call of the user equipment ends, and send the clearing message to a BSC or an RNC, so as to trigger a fast-return procedure at the BSC or the RNC. In this way, the BSC or the RNC can fast return the user equipment to an LTE network.

Figure 5:
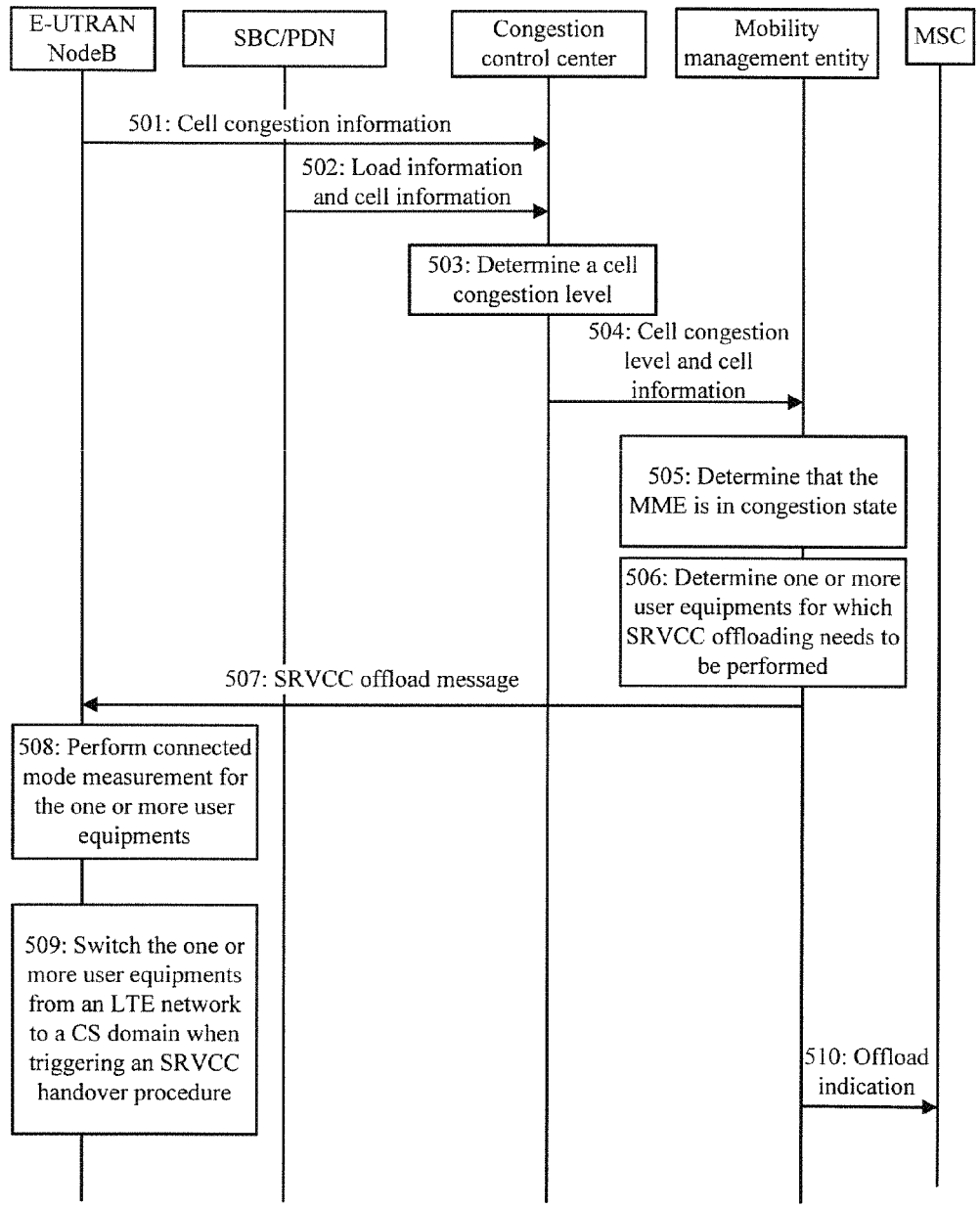
FIG. 5 is a schematic flowchart of a congestion control implementation method according to an embodiment of the present invention.

FIG. 5 is a schematic flowchart of a congestion control implementation method according to an embodiment of the present invention.

Optionally, in an embodiment, a congestion control center may acquire cell congestion information by executing step 501.

501: The congestion control center receives cell congestion information sent by an E-UTRAN NodeB (eNodeB), where the cell congestion information includes a cell congestion level and cell information.

Specifically, the E-UTRAN NodeB may periodically detect load information of a cell, where the load information includes information such as an air-interface physical resource block (Physical Resource Block, PRB) utilization rate, a VoLTE call setup success rate, and an IP QoS level of VoLTE bearer. According to a result of the detection, a cell congestion level of the cell is determined. The E-UTRAN NodeB sends the cell congestion information, which carries the cell congestion level and the cell information, to the congestion control center, where the cell information may be the E-UTRAN Cell Global Identifier (E-UTRAN Cell Global Identifier, eCGI).

Optionally, in another embodiment, the congestion control center may further acquire the cell congestion information by executing step 502 and step 503.

502: The congestion control center receives load information and cell information of an LTE cell from a session boarder controller (Session Boarder Controller, SBC) or a packet data network (Packet Data Network, PDN) gateway (PDN Gateway, P-GW), where the load information includes information such as a PRB utilization rate, a VoLTE call setup success rate, and an IP QoS level of VoLTE bearer, and the cell information may be an eCGI.

Specifically, the SBC may collect the load information by means of call sampling. The P-GW may perform a deep packet inspection (Deep Packet Inspection, DPI) to parse out application layer information and derive the load information from the application layer information.

503: The congestion control center determines a cell congestion level of the LTE cell according to the load information of the LTE cell.

When step 501 is executed or when step 502 and step 503 are executed, step 504 may be executed, so that an MME acquires the cell congestion level and the cell information from the congestion control center.

504: The congestion control center sends the cell congestion level and the cell information to an MME.

Optionally, the congestion control center may send the cell congestion level and the cell information to the MME in a form of congested-cell list.

505: The MME determines that the MME is in congestion state according to the cell congestion level. For example, when the cell congestion level meets a preset condition, the MME determines that the MME is in congestion state.

It should be noted that, step 501 to step 505 are optional steps. By executing steps 501 through 505, it may be determined to commence an SRVCC offloading procedure when the MME is in congestion state, so that one or more user equipments will be offloaded to a CS domain. It can be understood that, the MME may use another means to determine commencement of the SRVCC offloading procedure. For example, the MME may determine, according to a received request from a user equipment or another network side device (such as a base station), that the SRVCC offloading procedure is to commence, so that the one or more user equipments will be offloaded to the CS domain.

506: The MME determines one or more user equipments for which SRVCC offloading needs to be performed.

Specifically, the MME may determine the one or more user equipments according to information such as priority, location information, camped cell, current service state, and capability of the one or more user equipments.

Optionally, the MME may switch the one or more user equipments from the CS domain back to an LTE domain when necessary.

Specifically, when determining the one or more user equipments, the MME may further mark the one or more user equipments as user equipments for which SRVCC offloading is already performed, so that when the one or more user equipments need to be restored to be VoLTE user equipments, the one or more user equipments can be rapidly distinguished by the marker and restored to be VoLTE user equipments.

507: The MME sends an SRVCC offload message to an E-UTRAN NodeB (eNodeB) serving the one or more user equipments, so that when triggering an SRVCC handover procedure, the E-UTRAN NodeB to which the one or more user equipments belong switches the one or more user equipments from an LTE domain to a CS domain.

Specifically, the MME may notify, by using the SRVCC offload message, the E-UTRAN NodeB to which the one or more user equipments belong of the one or more user equipments for which of needs to be performed.

Optionally, before step 509 is executed, step 508 may further be executed to increase the probability of the SRVCC handover being successful.

508: When the E-UTRAN NodeB to which the one or more user equipments belong receives the SRVCC offload message, the E-UTRAN NodeB performs connected mode measurement for the one or more user equipments, for example, it measures information such as frequencies and signal quality of neighboring cells, where the neighboring cells are 2G cells or 3G cells. In this way, when the SRVCC handover procedure is performed for the one or more user equipments, a target cell may be selected according to a result of the measurement (for example, a cell with better signal quality is selected), thereby increasing the probability of the SRVCC handover being successful.

509: The E-UTRAN NodeB to which the one or more user equipments belong switches the one or more user equipments from the LTE domain to the CS domain during the SRVCC handover procedure triggered for the one or more user equipments. Alternatively, when step 508 is already executed, the E-UTRAN NodeB to which the one or more user equipments belong switches, according to the result of the connected mode measurement, the one or more user equipments from the LTE domain to the CS domain when triggering the SRVCC handover procedure for the one or more user equipments.

Specifically, when the E-UTRAN NodeB receives the SRVCC offload message, the E-UTRAN NodeB triggers the SRVCC handover procedure for the one or more user equipments. When the SRVCC handover procedure is successfully performed, the one or more user equipments may be switched from VoLTE user equipments to VoCS user equipments, and resort to the CS domain for communication. The SRVCC offloading reduces load of the LTE cell, and enables the user equipments to switch from VoLTE to VoCS for communication, which in turn improves QoS and user experience.

510: The MME may further send an offload indication to an MSC, where the offload indication is used to notify the MSC that the one or more user equipments are user equipments for which SRVCC offloading is already performed. This is done so that the MSC manages and controls the one or more SRVCC-offloaded user equipments.

Specifically, the MME may use a PS to CS HO req message on an Sv interface to carry the offloading indication. The MSC may manage and control, according to the offload indication, the one or more user equipments for which SRVCC offloading is already performed.

Specifically, the practice of managing and controlling, by the MSC according to the offload indication, the one or more SRVCC-offloaded user equipments includes: When a voice call of the one or more user equipments ends, the MSC may send return-to-LTE-domain information to a BSC or an RNC by using a clearing message, so that the BSC or the RNC fast returns the one or more user equipments to the LTE domain.

Before sending the return-to-LTE-domain information to the BSC or the RNC, the MSC may further add a tariff indication to a charging data record for voice call fallback of the one or more user equipments, where the tariff indication is used to indicate that the one or more user equipments use a same tariff policy as a VoLTE user equipment.

Applying a consistent tariff policy would prevent user experience from being compromised when SRVCC offloading is performed for the one or more user equipments.

Before sending the return-to-LTE-domain information to the BSC or the RNC, the MSC may further determine, when the one or more user equipments make a voice call, that high-speed encoding and decoding is used during the voice call.

According to the method shown in FIG. 5, an MME can instruct, by using an SRVCC offload message, an E-UTRAN NodeB to which one or more user equipments belong to trigger an SRVCC handover procedure. When the SRVCC handover procedure is completed, the one or more user equipments can be switched from VoLTE user equipments to VoCS user equipments. In this way, LTE cell load can be alleviated and QoS of the one or more user equipments can be guaranteed.

Figure 6:
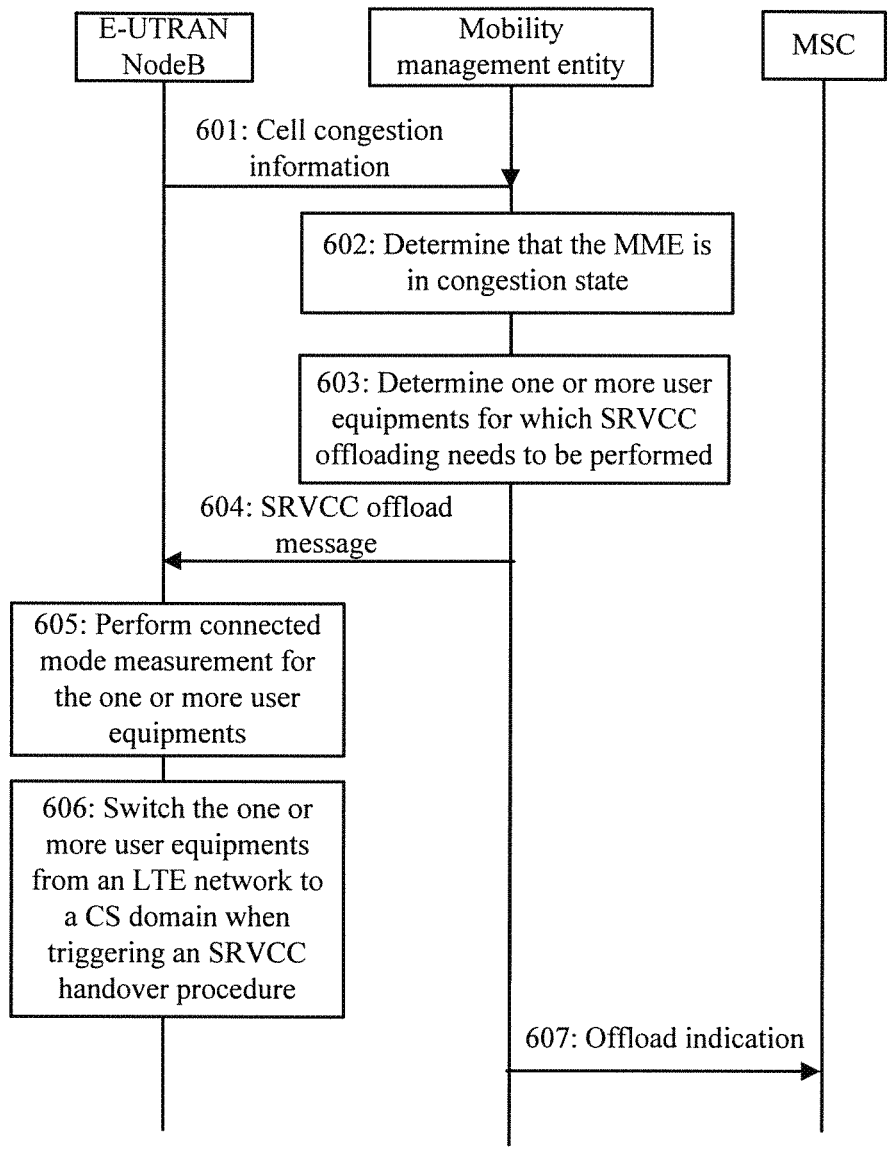
FIG. 6 is a schematic flowchart of another congestion control implementation method according to an embodiment of the present invention.

FIG. 6 is a schematic flowchart of another congestion control implementation method according to an embodiment of the present invention.

601: An MME receives cell congestion information sent by an E-UTRAN NodeB (eNodeB), where the cell congestion information includes a cell congestion level and cell information.

Specifically, the E-UTRAN NodeB (eNodeB) may periodically detect load information of a cell, where the load information includes information such as an air-interface PRB utilization rate, a VoLTE call setup success rate, and an IP QoS level of VoLTE bearer. According to a result of the detection, a cell congestion level of the cell is determined. The E-UTRAN NodeB may periodically send the cell congestion information, which carries the cell congestion level and the cell information, to the MME, where the cell information may be an eCGI.

It should be noted that, step 601 may be an optional step, and when the MME is in congestion state, it may be determined, by executing step 601, that an SRVCC offloading procedure is to commence, so that one or more user equipments will be offloaded to a CS domain. It can be understood that, the MME may use another means to determine commencement of the SRVCC offloading procedure. For example, the MME may determine, according to a received request from a user equipment or another network side device (such as a base station), that the SRVCC offloading procedure is to commence, so that the one or more user equipments will be offloaded to the CS domain.

Step 602 to step 607 are the same as step 505 to step 510 shown in FIG. 5, in terms of what specific operation to perform in a step and whether the step is optional. Therefore, details are not repeatedly described herein.

According to the method shown in FIG. 6, an MME can instruct, by using an SRVCC offload message, an E-UTRAN NodeB to which one or more user equipments belong to trigger an SRVCC handover procedure. When the SRVCC handover procedure is completed, the one or more user equipments can be switched from VoLTE user equipments to VoCS user equipments. In this way, LTE cell load can be alleviated and QoS of the one or more user equipments can be guaranteed.

Figure 7:
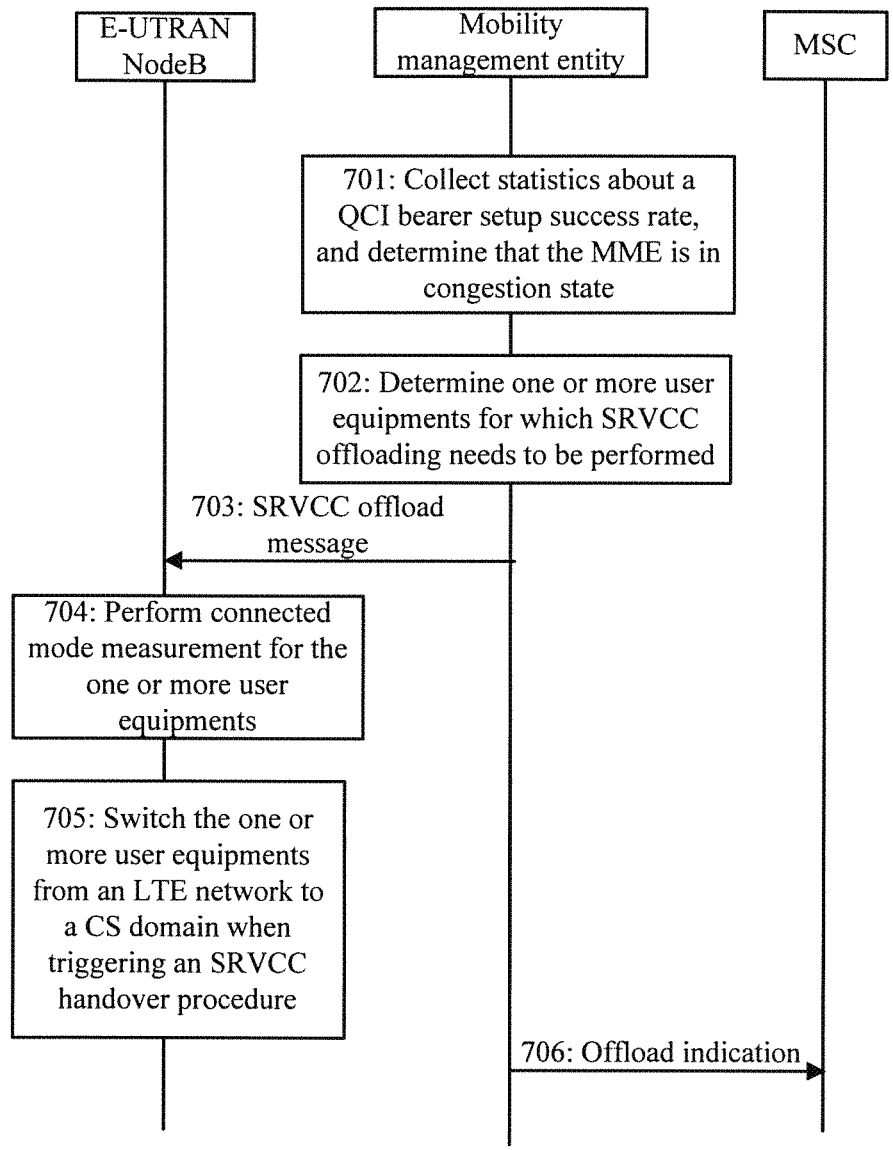
FIG. 7 is a schematic flowchart of another congestion control implementation method according to an embodiment of the present invention.

FIG. 7 is a schematic flowchart of another congestion control implementation method according to an embodiment of the present invention.

701: An MME collects statistics about a QoS class identifier (QoS Class Identifier, QCI) bearer setup success rate, and when the QCI bearer setup success rate is less than a preset threshold, determines that the MME is in congestion state.

It should be noted that, step 701 may be an optional step. By executing step 701, it may be determined that an SRVCC of procedure will commence when the MME is in congestion state, so that one or more user equipments will be offloaded to a CS domain. It can be understood that, the MME may use another means to determine commencement of the SRVCC offloading procedure. For example, the MME may determine, according to a received request from a user equipment or another network side device (such as a base station), that the SRVCC offloading procedure is to commence, so that the one or more user equipments will be offloaded to the CS domain.

Step 702 to step 706 are the same as step 506 to step 510 shown in FIG. 5, in terms of what specific operation to perform in a step and whether the step is optional. Therefore, details are not repeatedly described herein.

According to the method shown in FIG. 7, an MME can instruct, by using an SRVCC offload message, an E-UTRAN NodeB to which one or more user equipments belong to trigger an SRVCC handover procedure. When the SRVCC handover procedure is completed, the one or more user equipments can be switched from VoLTE user equipments to VoCS user equipments. In this way, LTE cell load can be alleviated and QoS of the one or more user equipments can be guaranteed.

Figure 8:
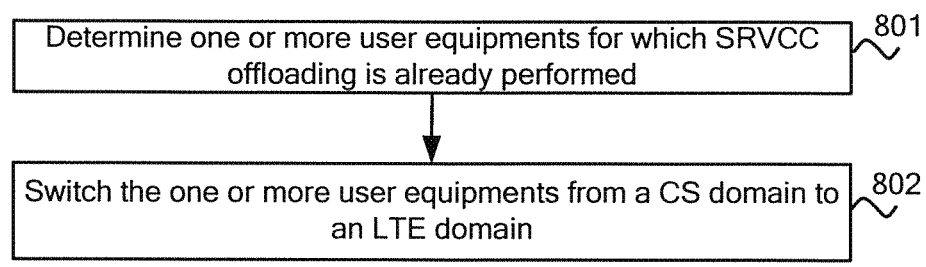
FIG. 8 is a schematic flowchart of a congestion control implementation method according to an embodiment of the present invention.

FIG. 8 is a schematic flowchart of a congestion control implementation method according to an embodiment of the present invention. The method shown in FIG. 8 is executed by an MME.

801: Determine one or more user equipments for which SRVCC offloading is already performed.

Optionally, the MME may determine the one or more user equipments according to a marker generated when SRVCC offloading is performed for the one or more user equipments.

Optionally, before the one or more user equipments are determined, the MME may further determine that the MME is in normal state.

Specifically, the MME may determine that the MME is in normal state according to a cell congestion level and cell information that are sent by a congestion control center. The MME may also collect statistics about a QCI bearer setup success rate, and determine that the MME is in normal state when the QCI bearer setup success rate is greater than a preset threshold. Specific steps are similar to step 501 to step 504 shown in FIG. 5, step 601 shown in FIG. 6, and step 701 shown in FIG. 7, and details are not repeatedly described herein.

It can be understood that, the MME may use another means to determine commencement of the step 801. For example, the MME may determine, according to a received request from a user equipment or another network side device (such as a base station), the one or more user equipments for which SRVCC offloading is already performed, so that the one or more user equipments will be restored to be VoLTE user equipments.

802: Switch the one or more user equipments from a CS domain to an LTE domain.

It should be noted that, when a user equipment is switched from the CS domain to the LTE domain, it indicates that the user equipment is restored to be a VoLTE user equipment.

According to the method shown in FIG. 8, an MME may restore a user equipment for which SRVCC offloading is already performed to be a VoLTE user equipment, so that the user equipment may be offered a same user experience as a VoLTE user equipment.

Figure 9:
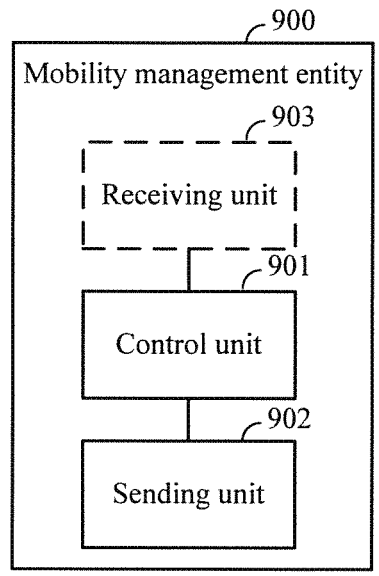
FIG. 9 is a structural block diagram of a mobility management entity according to an embodiment of the present invention.

FIG. 9 is a structural block diagram of a mobility management entity according to an embodiment of the present invention. The mobility management entity (Mobility Management Entity, MME) 900 shown in FIG. 9 can execute each step executed by the MME in FIG. 1, FIG. 2, and FIG. 5 to FIG. 7. The MME 900 includes a control unit 901 and a sending unit 902.

The control unit 901 is configured to determine one or more user equipments for which SRVCC offloading needs to be performed.

The sending unit 902 is configured to send an SRVCC offload message to an E-UTRAN NodeB (eNodeB) serving the one or more user equipments determined by the control unit 901, so that when triggering an SRVCC handover procedure, the E-UTRAN NodeB switches the one or more user equipments from an LTE domain to a CS domain.

The MME 900 shown in FIG. 9 can instruct, by using an SRVCC offload message, an E-UTRAN NodeB to which one or more user equipments belong to trigger an SRVCC handover procedure. When the SRVCC handover procedure is completed, the one or more user equipments can be switched from VoLTE user equipments to VoCS user equipments. In this way, LTE cell load can be alleviated and QoS of the one or more user equipments can be guaranteed.

Optionally, the control unit 901 is further configured to determine, before the one or more user equipments are determined, that the MME is in congestion state.

Optionally, the MME 900 may further include a receiving unit 903. The receiving unit 903 is configured to receive cell congestion information sent by a network side device, where the cell congestion information includes a cell congestion level and cell information. The control unit 901 is specifically configured to determine, according to the cell congestion information, that the MME 900 is in congestion state.

Optionally, the control unit 901 may further be configured to collect statistics about a QCI bearer setup success rate. The control unit 901 is specifically configured to: when the QCI bearer setup success rate is less than a preset threshold, determine that the MME is in congestion state.

Optionally, the sending unit 902 is further configured to send an offload indication to an MSC, where the offload indication is used to notify the MSC that the one or more user equipments are user equipments for which SRVCC offloading is already performed. This is done so that the MSC manages and controls the user equipments for which SRVCC offloading is already performed.

Optionally, the control unit 901 may be configured to switch the one or more user equipments from the CS domain back to the LTE domain when necessary. Specifically, when the one or more user equipments are determined, the control unit 901 may further be configured to mark the one or more user equipments as SRVCC-offloaded user equipments, so that the one or more user equipments can be rapidly and accurately determined when the one or more user equipments need to be restored to be VoLTE user equipments.

Figure 10:
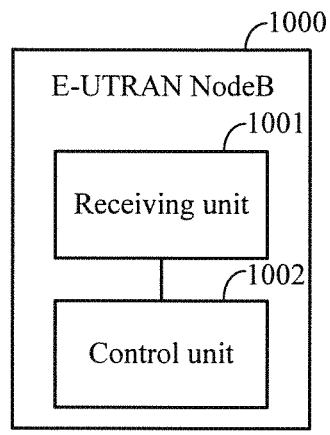
FIG. 10 is a structural block diagram of an E-UTRAN NodeB according to an embodiment of the present invention.

FIG. 10 is a structural block diagram of an E-UTRAN NodeB according to an embodiment of the present invention. The E-UTRAN NodeB (eNodeB) 1000 may execute each step executed by the E-UTRAN NodeB in FIG. 1, FIG. 3, and FIG. 5 to FIG. 7. As shown in FIG. 10, the E-UTRAN NodeB 1000 includes a receiving unit 1001 and a control unit 1002.

The receiving unit 1001 is configured to receive an SRVCC offload message sent by an MME, where the SRVCC offload message is used to instruct to trigger an SRVCC handover procedure for one or more user equipments served by the E-UTRAN NodeB 1000.

The control unit 1002 is configured to switch, according to the SRVCC offload message received by the receiving unit 1001, the one or more user equipments from an LTE domain to a CS domain when the SRVCC handover procedure is triggered for the one or more user equipments.

When the E-UTRAN NodeB 1000 shown in FIG. 10 receives an SRVCC offload message sent by an MME, the E-UTRAN NodeB 1000 may trigger an SRVCC handover procedure for one or more user equipments. When the SRVCC handover procedure is successfully performed, the one or more user equipments can be switched from VoLTE user equipments to VoCS user equipments. In this way, LTE cell load can be alleviated and QoS of the one or more user equipments can be guaranteed.

Optionally, the control unit 1002 may further be configured to: when the receiving unit 1001 receives the SRVCC offload message, perform connected mode measurement for the one or more user equipments, for example, measuring information such as frequencies and signal quality of neighboring cells, where the neighboring cells are 2G cells or 3G cells. The control unit 1002 is specifically configured to switch, according to a result of the connected mode measurement, the one or more user equipments from the LTE domain to the CS domain when the SRVCC handover procedure is triggered for the one or more user equipments.

Figure 11:
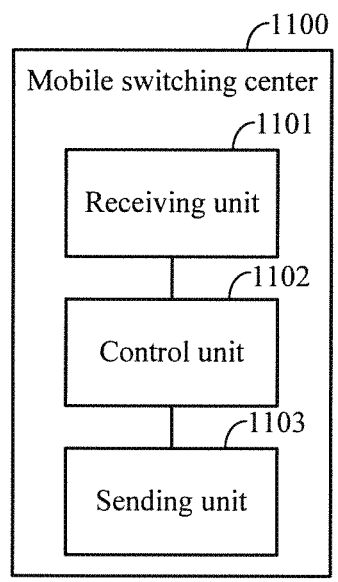
FIG. 11 is a structural block diagram of a mobile switching center according to an embodiment of the present invention.

FIG. 11 is a structural block diagram of a mobile switching center according to an embodiment of the present invention. The MSC 1100 may execute each step executed by the MSC in FIG. 4 to FIG. 7. As shown in FIG. 11, the MSC 1100 includes: a receiving unit 1101, a control unit 1102, and a sending unit 1103.

The receiving unit 1101 is configured to receive an offload indication sent by an MME, where the offload indication is used to notify the MSC that one or more user equipments are user equipments for which SRVCC offloading is already performed.

The control unit 1102 is configured to manage and control the one or more user equipments according to the offload indication.

Specifically, the control unit 1102 is configured to determine return-to-LTE-domain information according to the offload indication received by the receiving unit 1101. The sending unit 1103 is configured to: when a voice call of the one or more user equipments ends, send the return-to-LTE-domain information determined by the control unit 1102 to a BSC or an RNC by using a clearing message, so that the BSC or the RNC fast returns the one or more user equipments to a Long Term Evolution LTE domain.

Optionally, the return-to-LTE-domain information may include 4G PLMN information and a fast-return indication.

The MSC 1100 shown in FIG. 11 may learn a user equipment for which SRVCC offloading is already performed, add return information in a clearing message sent when a voice call of the user equipment ends, and send the clearing message to a BSC or an RNC, so as to trigger a fast-return procedure at the BSC or the RNC. In this way, the BSC or the RNC can fast return the user to an LTE network.

Optionally, the control unit 1102 is further configured to add, according to the offload indication received by the receiving unit 1101, a tariff indication to a charging data record for voice call fallback of the one or more user equipments before the sending unit 1103 sends the return-to-LTE-domain information, where the tariff indication is used to indicate that the one or more user equipments use a same tariff policy as a VoLTE user equipment.

Applying a consistent tariff policy would prevent user experience from being compromised when SRVCC offloading is performed for the one or more user equipments.

Optionally, when the one or more user equipments make a voice call, the control unit 1102 is further configured to: before the sending unit 1103 sends the return-to-LTE-domain information, determine, according to the offload indication received by the receiving unit 1101, that high-speed encoding and decoding is used during the voice call.

Figure 12:
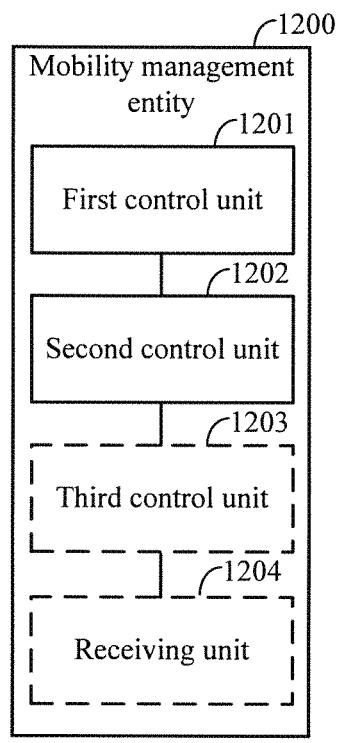
FIG. 12 is a schematic structural diagram of a mobility management entity according to an embodiment of the present invention.

FIG. 12 is a schematic structural diagram of a mobility management entity according to an embodiment of the present invention. The MME 1200 may execute each step executed by the MME shown in FIG. 8. As shown in FIG. 12, the MME 1200 includes: a first control unit 1201 and a second control unit 1202.

The first control unit 1201 is configured to determine one or more user equipments for which SRVCC offloading is already performed.

Optionally, the first control unit 1201 may determine the one or more user equipments according to a marker generated when SRVCC offloading is performed for the one or more user equipments.

The second control unit 1202 is configured to switch the one or more user equipments determined by the first control unit 1201 from a CS domain to an LTE domain.

It should be noted that, when a user equipment is switched from the CS domain to the LTE domain, it indicates that the user equipment is restored to be a VoLTE user equipment.

The MME 1200 shown in FIG. 12 may restore a user equipment for which SRVCC offloading is already performed to be a VoLTE user equipment, so that the user equipment may be offered a same user experience as a VoLTE user equipment.

Optionally, the MME 1200 may further include a third control unit 1203. The third control unit 1203 may be configured to determine, before the first control unit 1201 determines the one or more user equipments, that the MME is in normal state. Specifically, the MME 1200 may further include a receiving unit 1204, configured to receive cell congestion information sent by a network side device, where the cell congestion information includes a cell congestion level and cell information, and the third control unit 1203 is specifically configured to determine, according to the cell congestion information, that the MME is in normal state. Alternatively, the third control unit 1203 may further be configured to collect statistics about a QCI bearer setup success rate, and the third control unit 1203 is specifically configured to: when the QCI bearer setup success rate is greater than a preset threshold, determine that the MME is in normal state.

Figure 13:
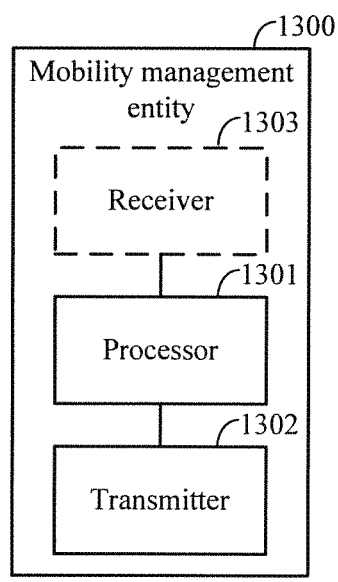
FIG. 13 is a structural block diagram of a mobility management entity according to an embodiment of the present invention.

FIG. 13 is a structural block diagram of a mobility management entity according to an embodiment of the present invention. The mobility management entity (Mobility Management Entity, MME) 1300 shown in FIG. 13 can execute each step executed by the MME in FIG. 1, FIG. 2, and FIG. 5 to FIG. 7. The MME 1300 includes a processor 1301 and a transmitter 1302.

The processor 1301 is configured to determine one or more user equipments for which SRVCC offloading needs to be performed.

The transmitter 1302 is configured to send an SRVCC offload message to an E-UTRAN NodeB (eNodeB) serving the one or more user equipments determined by the processor 1301, so that when triggering an SRVCC handover procedure, the E-UTRAN NodeB switches the one or more user equipments from an LTE domain to a CS domain.

The MME 1300 shown in FIG. 13 can instruct, by using an SRVCC offload message, an E-UTRAN NodeB to which one or more user equipments belong to trigger an SRVCC handover procedure. When the SRVCC handover procedure is completed, the one or more user equipments can be switched from VoLTE user equipments to VoCS user equipments. In this way, LTE cell load can be alleviated and QoS of the one or more user equipments can be guaranteed.

Optionally, the processor 1301 is further configured to determine, before the one or more user equipments are determined, that the MME is in congestion state.

Optionally, the MME 1300 may further include a receiver 1303. The receiver 1303 is configured to receive cell congestion information sent by a network side device, where the cell congestion information includes a cell congestion level and cell information. The processor 1301 is specifically configured to determine, according to the cell congestion information, that the MME 1300 is in congestion state.

Optionally, the processor 1301 is further configured to collect statistics about a QCI bearer setup success rate. The processor 1301 is specifically configured to: when the QCI bearer setup success rate is less than a preset threshold, determine that the MME is in congestion state.

Optionally, the transmitter 1302 is further configured to send an offload indication to an MSC, where the offload indication is used to notify the MSC that the one or more user equipments are user equipments for which SRVCC offloading is already performed, so that the MSC manages and controls the one or more SRVCC-offloaded user equipments.

Optionally, the processor 1301 may be configured to switch the one or more user equipments from the CS domain back to the LTE domain when necessary. Specifically, when the one or more user equipments are determined, the processor 1301 may further be configured to mark the one or more user equipments as SRVCC-offloaded user equipments, so that the one or more user equipments can be rapidly and accurately determined when the one or more user equipments need to be restored to be VOLTE user equipments.

Figure 14:
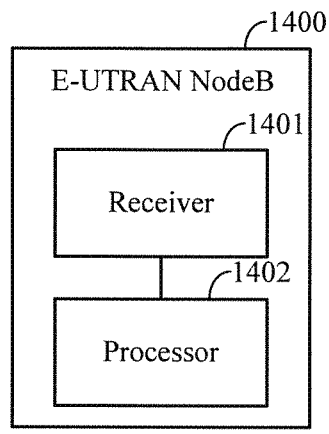
FIG. 14 is a structural block diagram of an E-UTRAN NodeB according to an embodiment of the present invention.

FIG. 14 is a structural block diagram of an E-UTRAN NodeB according to an embodiment of the present invention. The E-UTRAN NodeB (eNodeB) 1400 may execute each step executed by the E-UTRAN NodeB in FIG. 1, FIG. 3, and FIG. 5 to FIG. 7. As shown in FIG. 14, the E-UTRAN NodeB 1400 includes a receiver 1401 and a processor 1402.

The receiver 1401 is configured to receive an SRVCC offload message sent by an MME, where the SRVCC offload message is used to instruct to trigger an SRVCC handover procedure for one or more user equipments served by the E-UTRAN NodeB 1400.

The processor 1402 is configured to switch, according to the SRVCC offload message received by the receiver 1401, the one or more user equipments from an LTE domain to a CS domain when the SRVCC handover procedure is triggered for the one or more user equipments.

When the E-UTRAN NodeB 1400 shown in FIG. 14 receives an SRVCC offload message sent by an MME, the E-UTRAN NodeB 1400 may trigger an SRVCC handover procedure for one or more user equipments. When the SRVCC handover procedure is successfully performed, the one or more user equipments can be switched from VoLTE user equipments to VoCS user equipments. In this way, LTE cell load can be alleviated and QoS of the one or more user equipments can be guaranteed.

Optionally, the processor 1402 may further be configured to: when the receiver 1401 receives the SRVCC offload message, perform connected mode measurement for the one or more user equipments, for example, measuring information such as frequencies and signal quality of neighboring cells, where the neighboring cells are 2G cells or 3G cells. The processor 1402 is specifically configured to switch, according to a result of the connected mode measurement, the one or more user equipments from the LTE domain to the CS domain when the SRVCC handover procedure is triggered for the one or more user equipments.

Figure 15:
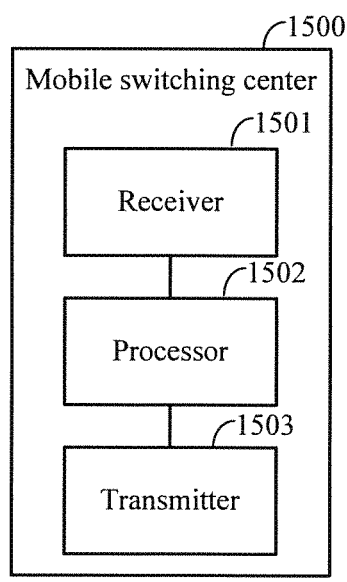
FIG. 15 is a structural block diagram of a mobile switching center according to an embodiment of the present invention.

FIG. 15 is a structural block diagram of a mobile switching center according to an embodiment of the present invention. The MSC 1500 may execute each step executed by the MSC in FIG. 4 to FIG. 7. As shown in FIG. 15, the MSC 1500 includes: a receiver 1501, a processor 1502, and a transmitter 1503.

The receiver 1501 is configured to receive an offload indication sent by an MME, where the offload indication is used to notify the MSC that one or more user equipments are user equipments for which SRVCC offloading is already performed.

The processor 1502 is configured to manage and control the one or more user equipments according to the offload indication.

Specifically, the processor 1502 is configured to determine return-to-LTE-domain information according to the offload indication received by the receiver 1501. The transmitter 1503 is configured to: when a voice call of the one or more user equipments ends, send the return-to-LTE-domain information determined by the processor 1542 to a BSC or an RNC by using a clearing message, so that the BSC or the RNC fast returns the one or more user equipments to a Long Term Evolution LTE domain.

Optionally, the return-to-LTE-domain information may include 4G PLMN information and a fast-return indication.

The MSC 1500 shown in FIG. 15 may learn a user equipment for which SRVCC offloading is already performed, add return information in a clearing message sent when a voice call of the user equipment ends, and send the clearing message to a BSC or an RNC, so as to trigger a fast-return procedure at the BSC or the RNC. In this way, the BSC or the RNC can fast return the user to an LTE network.

Optionally, the processor 1502 is further configured to add, according to the offload indication received by the receiver 1501, a tariff indication to a charging data record for voice call fallback of the one or more user equipments before the transmitter 1503 sends the return-to-LTE-domain information, where the tariff indication is used to indicate that the one or more user equipments use a same tariff policy as a VoLTE user equipment. Applying a consistent tariff policy would prevent user experience from being compromised when SRVCC offloading is performed for the one or more user equipments.

Optionally, when the one or more user equipments make a voice call, the processor 1502 is further configured to: before the transmitter 1503 sends the return-to-LTE-domain information, determine, according to the offload indication received by the receiver 1501, that high-speed encoding and decoding is used during the voice call.

Figure 16:
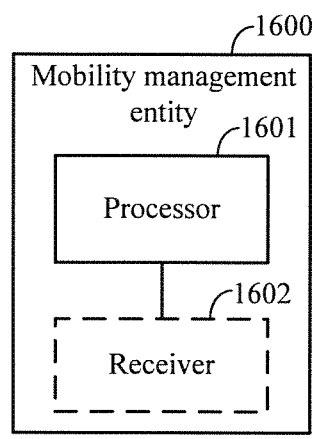
FIG. 16 is a schematic structural diagram of a mobility management entity according to an embodiment of the present invention.

FIG. 16 is a schematic structural diagram of a mobility management entity according to an embodiment of the present invention. The MME 1600 may execute each step executed by the MME shown in FIG. 8. As shown in FIG. 16, the MME 1600 includes: a processor 1601.

The processor 1601 is configured to determine one or more user equipments for which SRVCC offloading is already performed.

Optionally, the processor 1601 may determine the one or more user equipments according to a marker generated when SRVCC offloading is performed for the one or more user equipments.

The processor 1601 is further configured to switch the one or more user equipments from a CS domain to an LTE domain.

It should be noted that, when a user equipment is switched from the CS domain to the LTE domain, it indicates that the user equipment is restored to be a VoLTE user equipment.

The MME 1600 shown in FIG. 16 may restore a user equipment for which SRVCC offloading is already performed to be a VoLTE user equipment, so that the user equipment may be offered a same user experience as a VoLTE user equipment.

Optionally, before the processor 1601 determines the one or more user equipments, the processor 1601 may further be configured to determine that the MME is in normal state. Specifically, the MME 1600 may further include a receiver 1602, configured to receive cell congestion information sent by a network side device, where the cell congestion information includes a cell congestion level and cell information, and the processor 1601 is specifically configured to determine, according to the cell congestion information, that the MME is in normal state. Alternatively, the processor 1601 may further be configured to collect statistics about a QCI bearer setup success rate, and the processor 1601 is specifically configured to: when the QCI bearer setup success rate is greater than a preset threshold, determine that the MME is in normal state.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A congestion control implementation method, comprising:
   determining, by a mobility management entity (MME), one or more user equipments for which single radio voice call continuity (SRVCC) offloading needs to be performed;
   sending, by the MME, an SRVCC offload message to an E-UTRAN NodeB serving the one or more user equipments, so that when triggering an SRVCC handover procedure, the E-UTRAN NodeB switches the one or more user equipments from a Long Term Evolution (LTE) domain to a circuit switched (CS) domain; and
   sending, by the MME, an offload indication to a mobile switching center (MSC) after the E-UTRAN NodeB switches the one or more user equipments from the LTE domain to the CS domain, wherein the offload indication indicates to the MSC that SRVCC offloading is already performed for the one or more user equipments, so that the MSC manages and controls the one or more user equipments.

2. The method according to claim 1, wherein before determining one or more user equipments, the method further comprises:
   determining the MME is in a congestion state.

3. The method according to claim 2, wherein determining the MME is in a congestion state comprises:
   determining the MME is in a congestion state according to cell congestion information sent by a network side device, wherein the cell congestion information comprises a cell congestion level and cell information; or
   collecting statistics about a quality-of-service class identifier (QCI) bearer setup success rate, and when the QCI bearer setup success rate is less than a preset threshold, determining the MME is in a congestion state.

4. The method according to claim 1, wherein after the E-UTRAN NodeB switches the one or more user equipments from the LTE domain to the CS domain, the method further comprises:
   switching the one or more user equipments from the CS domain back to the LTE domain when CS-to-LTE switching is required.

5. The method according to claim 1, further comprising:
   determining one or more second user equipments for which single radio voice call continuity (SRVCC) offloading is already performed; and
   switching the one or more second user equipments from a circuit switched (CS) domain to a Long Term Evolution (LTE) domain.

6. The method according to claim 5, wherein before determining one or more second one or more user equipments, the method further comprises:
   determining the MME is in a normal state.

7. The method according to claim 6, wherein determining the MME is in a normal state comprises:
   determining, according to cell congestion information sent by a network side device, the MME is in a normal state, wherein the cell congestion information comprises a cell congestion level and cell information; or
   collecting statistics about a quality-of-service class identifier (QCI) bearer setup success rate, and when the QCI bearer setup success rate is greater than a preset threshold, determining the MME is in a normal state.

8. A mobility management entity (MME), comprising:
a processor configured to determine one or more user equipments for which single radio voice call continuity (SRVCC) offloading needs to be performed; and
a transmitter configured to:
  send an SRVCC offload message to an E-UTRAN NodeB serving the one or more user equipments determined by the processor, so that the E-UTRAN NodeB switches the one or more user equipments from a Long Term Evolution (LTE) domain to a circuit switched (CS) domain during an SRVCC handover procedure; and
  send an offload indication to a mobile switching center (MSC) after the E-UTRAN NodeB switches the one or more user equipments from the LTE domain to the CS domain, wherein the offload indication indicates to the MSC that SRVCC offloading is already performed for the one or more user equipments, so that the MSC manages and controls the one or more user equipments.

9. The MME according to claim 8, wherein the processor is further configured to determine, before the one or more user equipments are determined, the MME is in a congestion state.

10. The MME according to claim 9, further comprising:
a receiver, configured to receive cell congestion information sent by a network side device, wherein the cell congestion information comprises a cell congestion level and cell information; and
wherein the processor is configured to determine, according to the cell congestion information received by the receiver, the MME is in a congestion state.

11. The MME according to claim 9, wherein the processor is further configured to:
collect statistics about a quality-of-service class identifier (QCI) bearer setup success rate; and
when the QCI bearer setup success rate is less than a preset threshold, determine the MME is in a congestion state.

12. The MME according to claim 8, wherein the processor is further configured to switch the one or more user equipments from the CS domain to the LTE domain when CS-to-LTE switching is required.

13. The MME according to claim 8, wherein the processor is further configured to:
determine one or more second user equipments for which single radio voice call continuity (SRVCC) offloading is already performed; and
switch the one or more second user equipments from a circuit switched (CS) domain to a Long Term Evolution (LTE) domain.

* * * * *